UNITED STATES PATENT OFFICE.

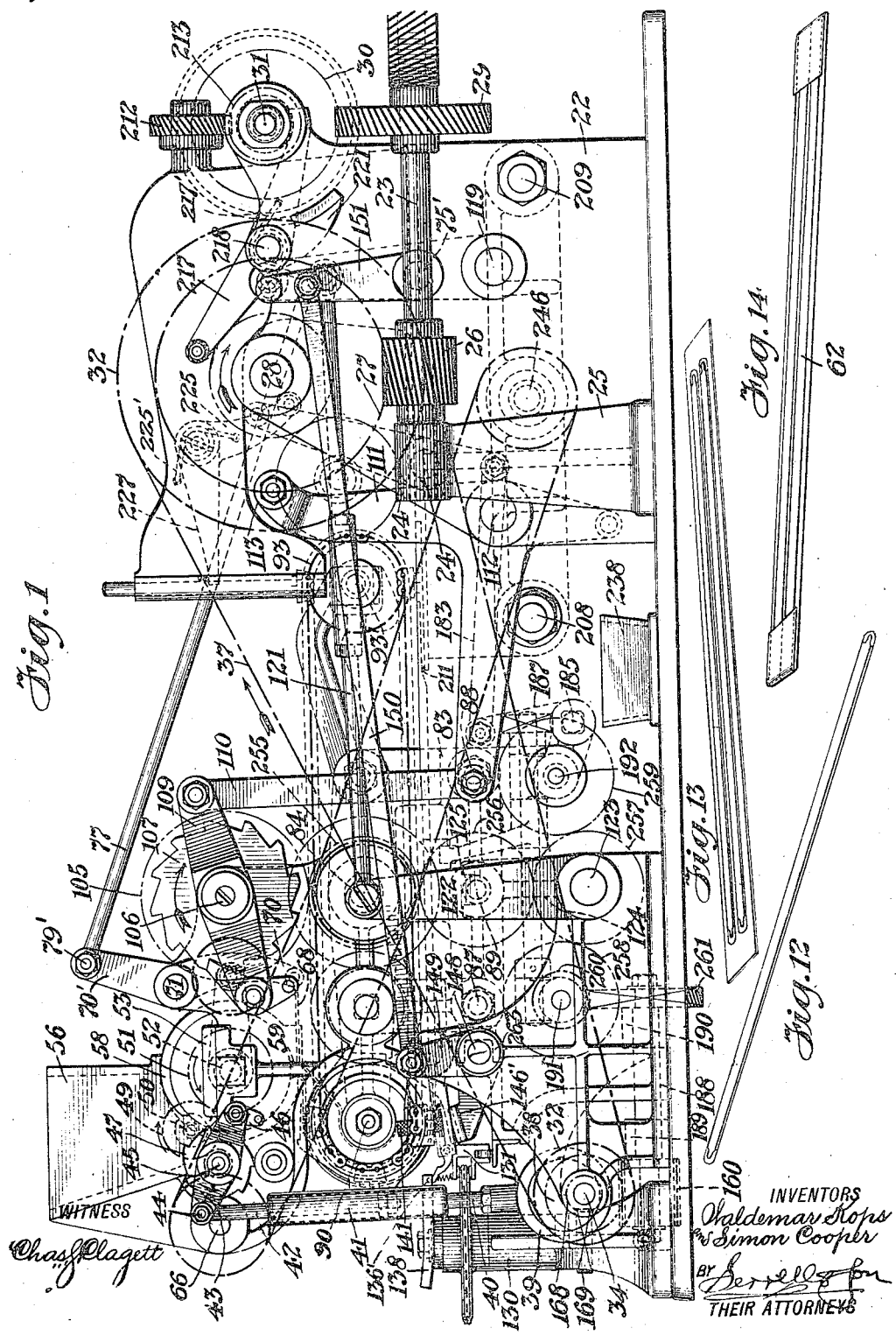

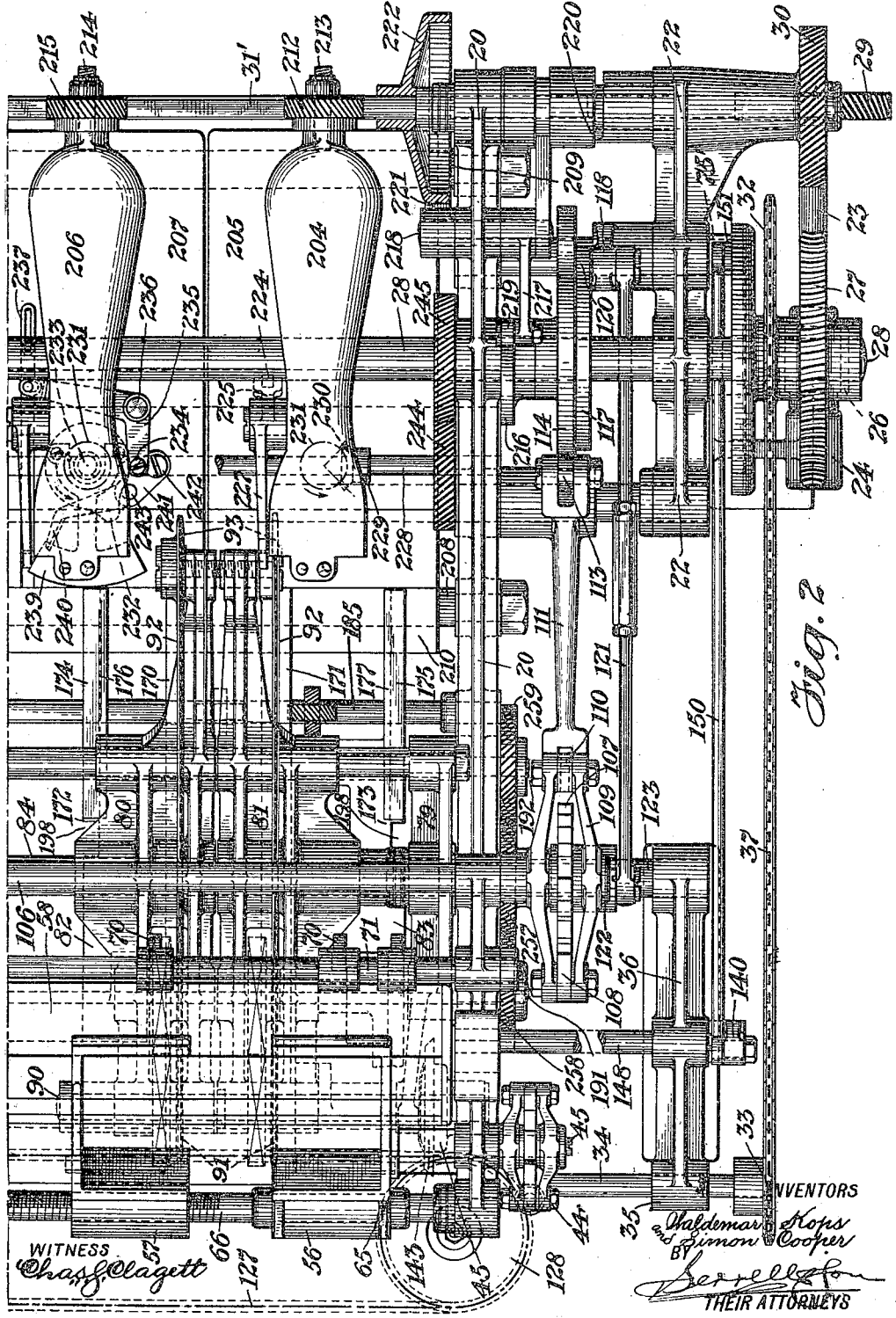

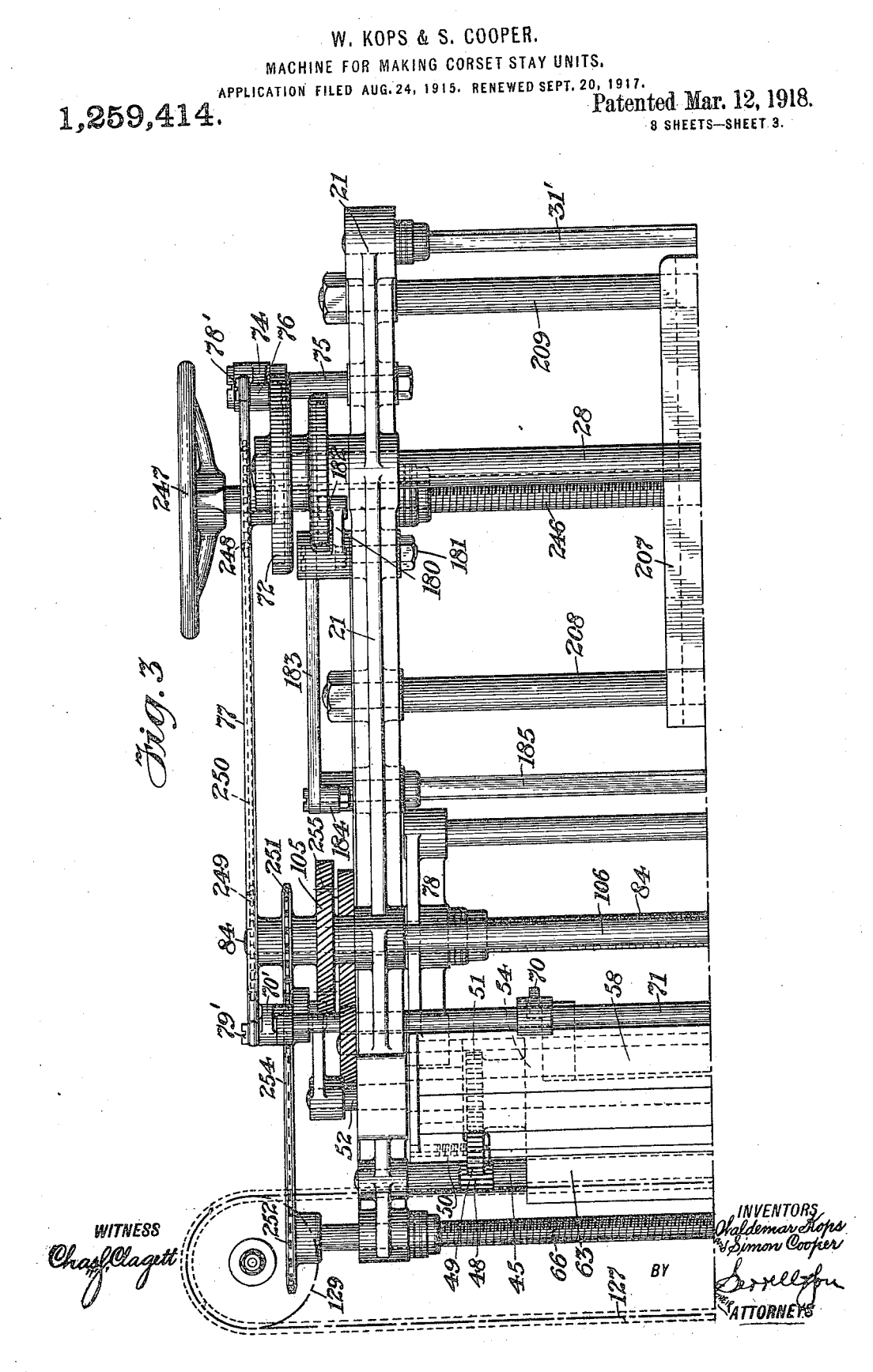

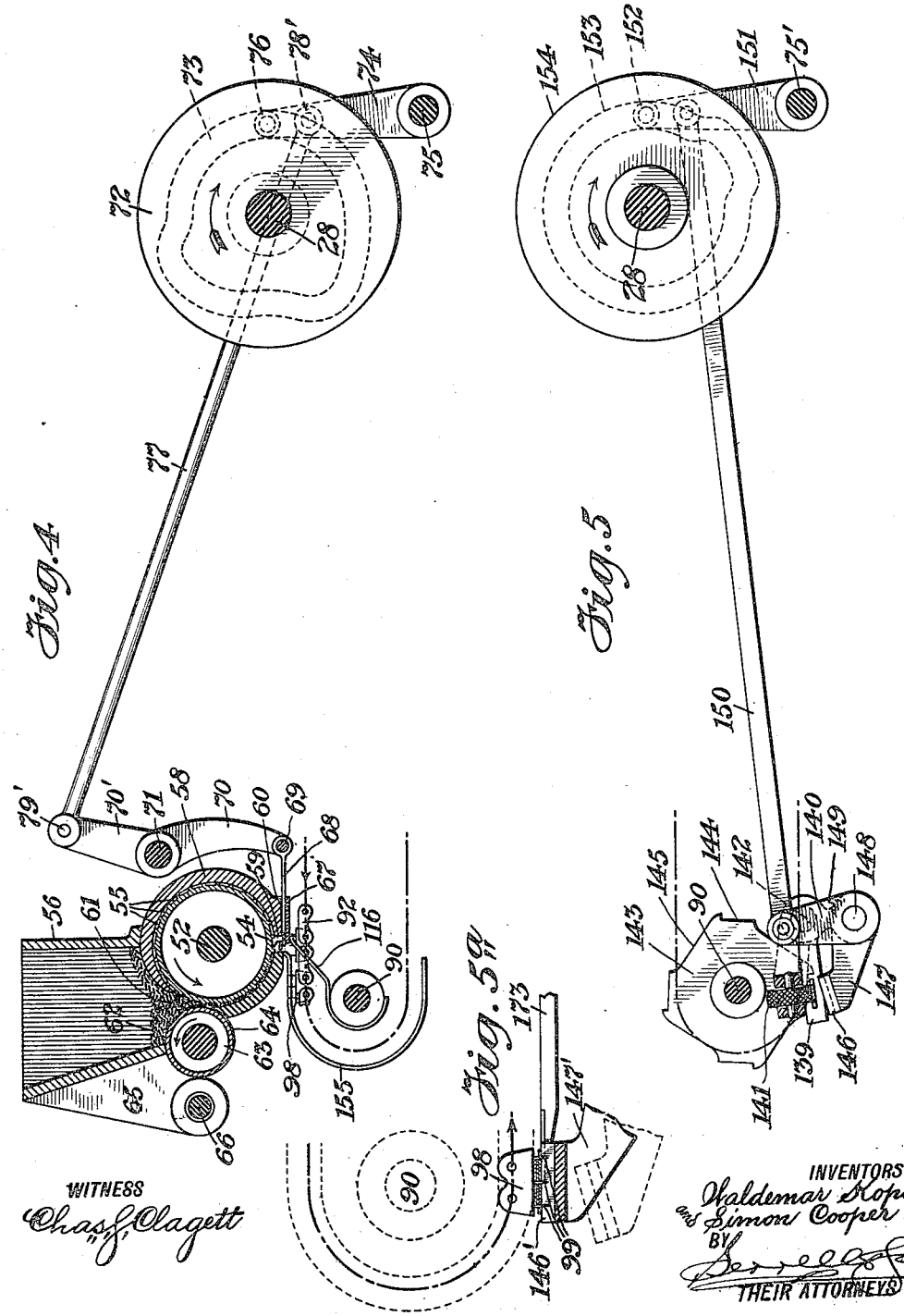

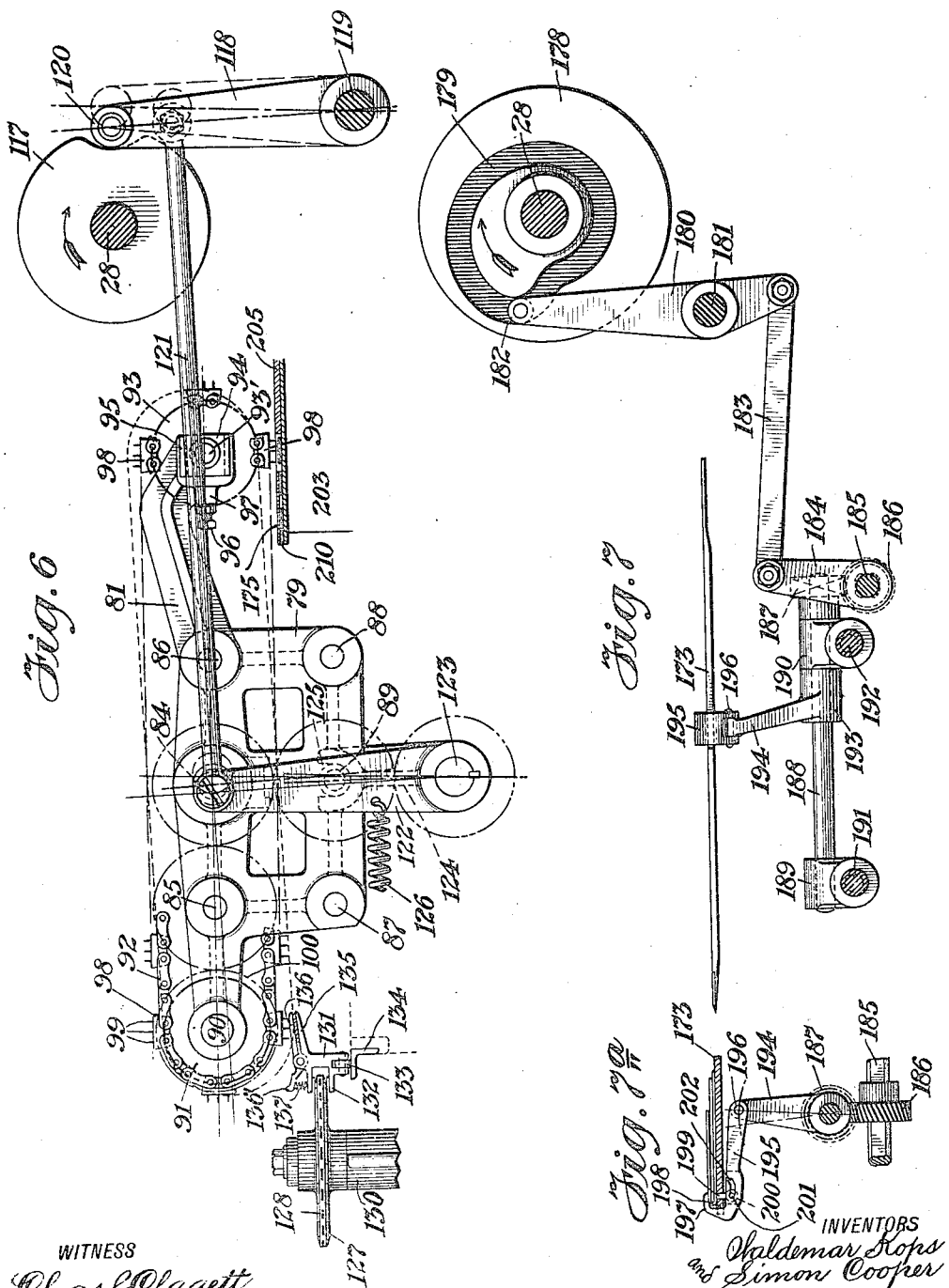

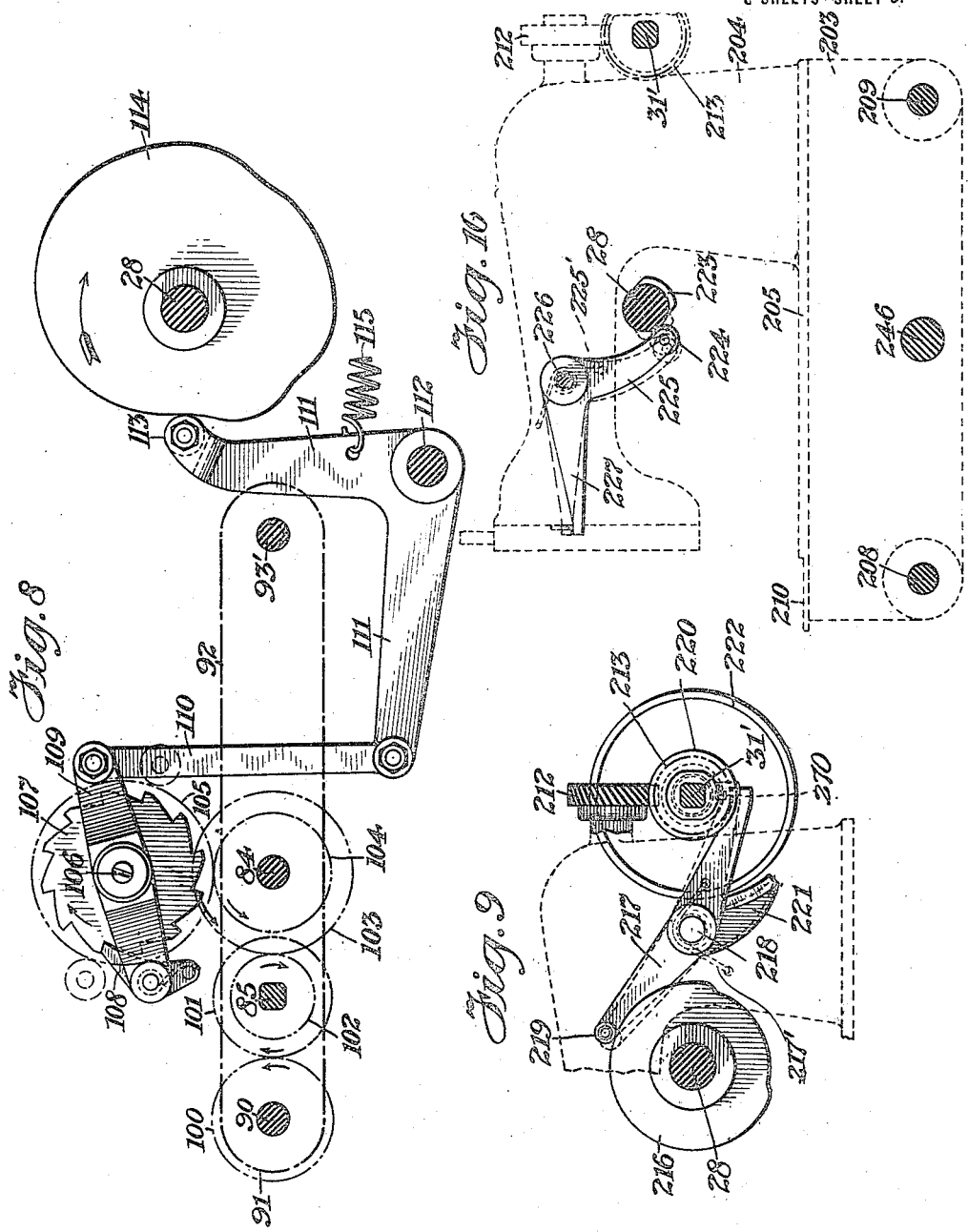

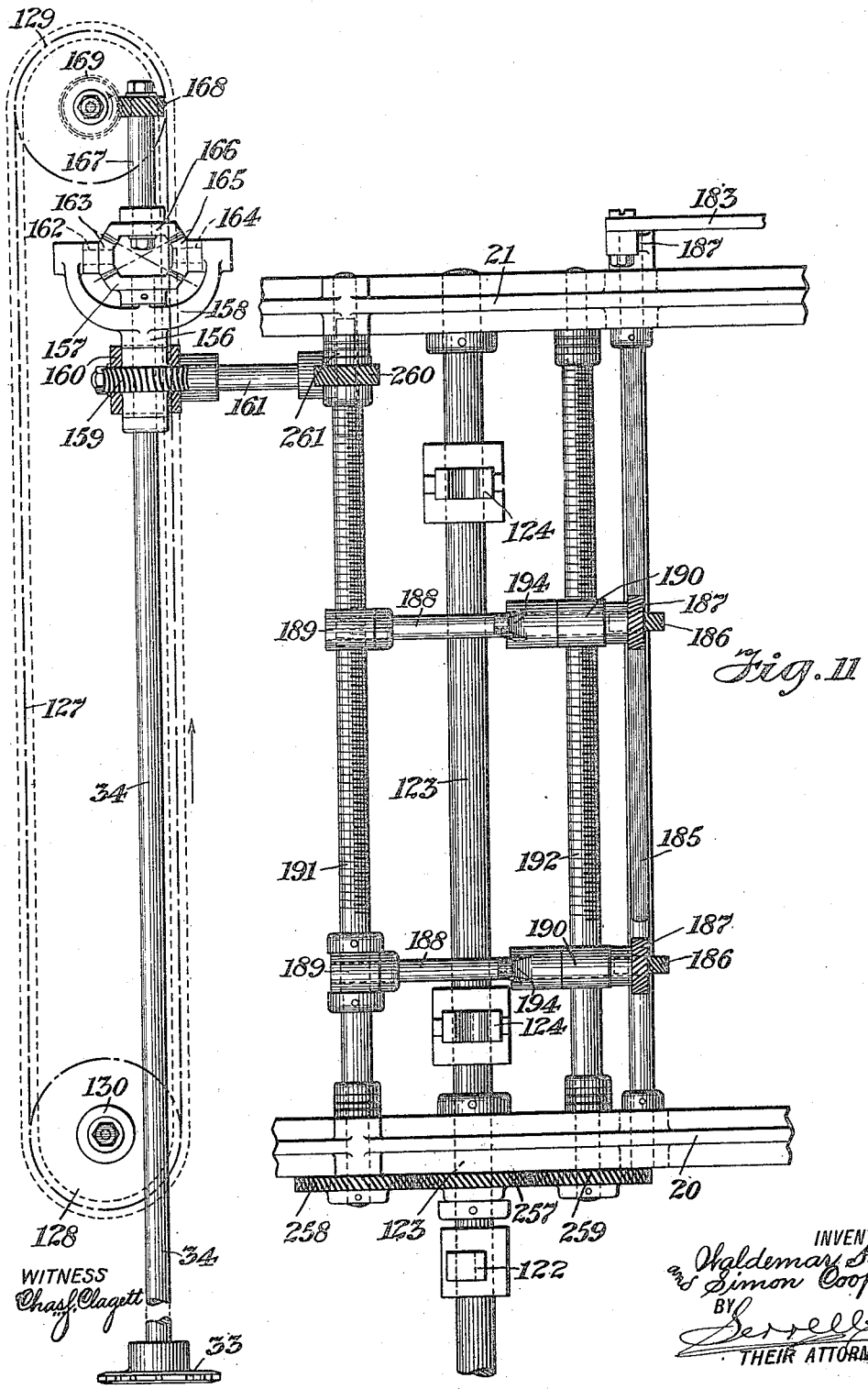

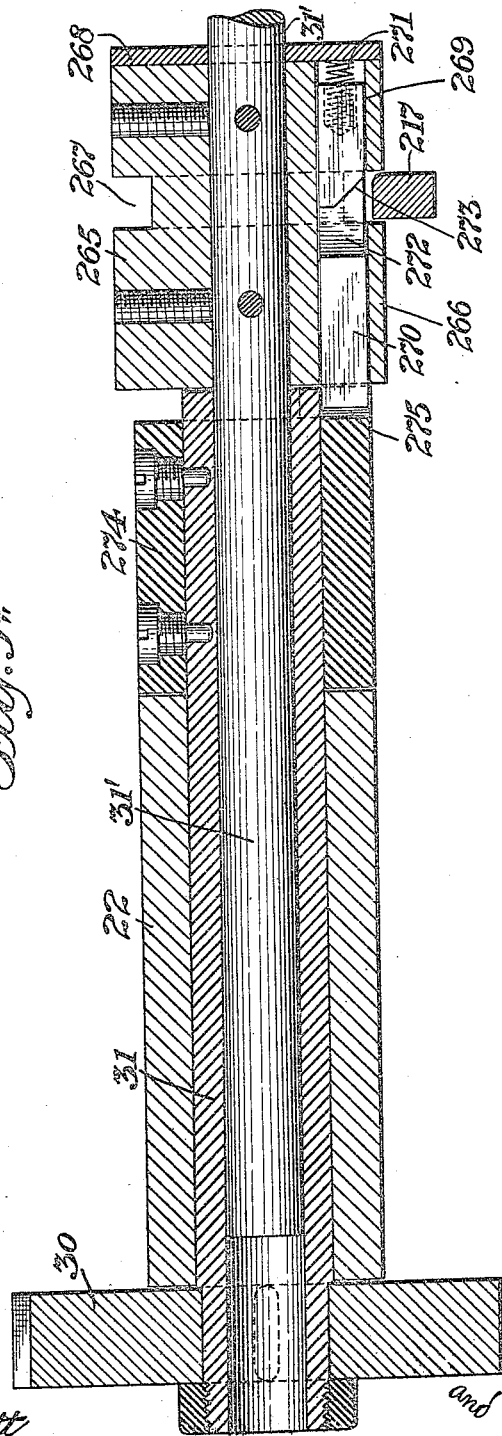

WALDEMAR KOPS AND SIMON COOPER, OF NEW YORK, N. Y., ASSIGNORS TO KOPS BROS., OF NEW YORK, N. Y., A FIRM COMPOSED OF DANIEL KOPS, MAX KOPS, AND WALDEMAR KOPS.

MACHINE FOR MAKING CORSET-STAY UNITS.

1,259,414.      Specification of Letters Patent.      Patented Mar. 12, 1918.

Application filed August 24, 1915, Serial No. 47,019. Renewed September 20, 1917. Serial No. 192,416.

*To all whom it may concern:*

Be it known that we, WALDEMAR KOPS and SIMON COOPER, both citizens of the United States, residing at the borough of Manhattan, in the city, county, and State of New York, have invented an Improvement in Machines for Making Corset-Stay Units, of which the following is a specification.

In the manufacture of apparel corsets, it is customary, as is well known, to employ an adequate number of suitably spaced stays, bones or other stiffeners.

Heretofore, in applying the stays to the garment, in the manufacture of corsets, it has been customary to secure a strip to the body of the garment to form a pocket therein, or to otherwise provide a pocket in the body of the garment into which the stay or boning is inserted. In this method of construction, it is then necessary to secure the stay in position in the garment and to reinforce the same at the ends of the stay in order to maintain the stay in position and to prevent it from working out of place and through the fabric of which the garment is made, and in so doing, it has been customary to utilize a different operator for each step in the method thus briefly described.

In a co-pending application, Serial No. 879438, filed December 29, 1914, by Waldemar Kops, one of the inventors in the present case, there is shown and described a stay unit and method of applying the same to a corset garment, which obviates the necessity of first providing the body of the garment with a pocket and then placing the stay therein and thereafter reinforcing the garment at the ends of the stays. This improved stay unit comprises one or more stay members placed upon a strip of suitable fabric which is turned over the corset stay or stays at the ends thereof, and secured in position by lines of sewing, or otherwise, which thus maintain in position the stay or stays comprising a particular unit. In applying this corset stay unit to the garment, after thus constructed, it is placed in position on the body of the corset and the cover member placed over the same, in order, by a single sewing operation, the cover member and stay unit are then secured to the body of the garment, whereby, as will be readily understood, the stays are prevented from working out of place and cutting through the fabric of which the garment is made, so that the labor and consequent cost of applying the corset stays to the garment is reduced, and furthermore there is no necessity in the use of these corset staying units of reinforcing the body of the garment at the ends of the stays.

The object of our present invention is the provision of a machine for making the stay units, to which reference has hereinbefore been made, that is, a corset stay unit comprising one or more stay members, and a strip of suitable fabric which is folded over the ends of the stay or stay members, and secured in position therein ready to be applied to the corset body, as hereinbefore described, the machine being so constructed as to be automatic in its operation, and adjustable to produce stay units of different lengths.

In the drawing Figure 1 is an end elevation of a machine made in accordance with our present invention.

Fig. 2 is a plan of one end of the machine, namely, that end from which the elevation shown in Fig. 1 is taken.

Fig. 3 is a plan view of the other end of the machine.

Fig. 4 is an elevation and partial cross section of a hopper, drum mechanism by which the stay members are delivered, one at a time, and conveyer devices, to which the same are delivered.

Fig. 5 is an elevation and partial cross section illustrating devices by which the strips of material to which the stay members are secured are cut and fed.

Fig. 5ᵃ is an elevation and partial cross section illustrating devices by which the strips of material are moved to position relatively to the stay member or members.

Fig. 6 is as elevation and partial cross section illustrating the conveyer devices and mechanism for swinging the frames on which the conveyer devices are mounted, and the gripper devices for feeding the strips of material from which the cover for the stay members are made.

Fig. 7 is an end elevation and partial cross section illustrating the devices for turning the ends of the strip or cover over the ends of the stay member or members comprising a particular stay unit and also the devices for actuating the same.

Fig. 7ª is a side elevation of one of the folder members.

Fig. 8 is an elevation and partial cross section illustrating the devices for driving the endless conveyer.

Figs. 9 and 10 are elevations and partial cross sections illustrating the devices for controlling the operation of the sewing machine.

Fig. 9ª is a sectional elevation illustrating the clutch mechanism employed to connect and disconnect the sewing machine shafts.

Fig. 11 is a plan of the devices by which the folder members are adjusted to position cross-wise of the machine to make it possible, in the use of the same, to accommodate the stay members of different lengths and consequently make it possible to produce stay units of correspondingly different lengths. This figure also includes the mechanism by which the strip cover members are fed.

Fig. 12 is a perspective view of a stay member.

Fig. 13 is a similar view showing a pair of stay members placed in position on a strip or cover for the same, and Fig. 14 is a perspective view of a completed stay unit.

Referring to the drawing, the machine made in accordance with our present invention preferably comprises two suitably spaced main side frames 20 and 21, and an auxiliary side frame 22.

A power shaft 23 is journaled in suitable bearings, one of which is indicated at 24 and mounted upon a support 25, the opposite end of the shaft, as will be understood, being similarly or suitably journaled.

On the power shaft 23 is a worm gear 26 meshing with a worm wheel 27 secured to the main drive shaft 28, which is suitably journaled in bearings provided therefor in the frames 20, 21 and 22. On the power shaft 23 there is also a worm gear 29. This worm gear meshes with the worm wheel 30 mounted on the sewing machine drive shaft 31, which is also suitably journaled in bearings provided therefor in the frames 20, 21 and 22.

On the shaft 28, there is a sprocket wheel 32, and 33 represents a sprocket wheel mounted on a shaft 34, one end of which is journaled in the bearing 35 at one end of a second auxiliary frame 36, the sprockets 32 and 33 being connected by a chain 37, so that the shaft 34 is driven from the shaft 28.

Suitably placed on the shaft 34, there is an eccentric 38 with its eccentric strap 39, which is provided with an eccentric rod 40. A sleeve 41 is connected at one end to the rod 40, and at its other end to a rod 42, the extremity of which is offset and connected to corresponding ends of a pair of levers 43 at the pivotal points indicated at 44. Centrally, or approximately so, the levers 43 are mounted on a shaft 45, which extends between and is journaled in the side frames 20 and 21. At their opposite ends the levers 43 are fitted with a pawl 46 adapted to engage the teeth of a ratchet 47, which is secured on the shaft 45 so that by the revolution of the shaft 34 and the reciprocating movement imparted to the rods 40 and 42, thereby, the shaft 45 is turned intermittently through the swinging action of the levers 43 and the ratchet 47 and pawl 46.

As indicated in Fig. 3, a portion of the shaft 45 is provided with gear teeth 48, meshing with which is a pinion 49. This pinion 49 is mounted on a stud 50. The pinion 49 meshes with a gear 51, secured on a shaft 52, which extends between the main side frames 20 and 21, and at its extremities is journaled in block and cover members 53, which are received and secured in position in suitable recesses provided therefor in the upper portions of the side frames 20 and 21, in order that this shaft, together with the parts associated therewith, may, if necessary, be readily removed from the machine. The stud 50 is secured in a collar surrounding the shaft 52 and fixed to the frame of the hopper hereinafter described.

On the shaft 52 there is a drum 54. This drum extends substantially the entire distance between the main side frames 20 and 21 and in the periphery thereof there are spaced longitudinal recesses or grooves 55 for the reception of one stay member at a time, as will be hereinafter more particularly described.

We also employ a hopper for the reception of the stay members, and this is preferably made into two similar parts, indicated at 56 and 57, both being open at the adjacent sides.

We also employ a drum frame 58, which surrounds the drum 54, and also extends substantially the entire distance between the main side frames 20 and 21, and is suitably secured thereto. In the bottom of this drum frame, there is a longitudinal opening 59 for the delivery of the stay members, and the bottom portion of the drum frame is preferably flat, as indicated at 60.

Adjacent the upper portion of the drum frame, and at one side thereof, the same is also open, as shown at 61, in order that the stay members indicated at 62, in Fig. 4, may work down by gravity and become lodged in the recesses 55, provided therefor in the periphery of the drum.

We also employ an auxiliary drum 63, secured on the shaft 45 and fitted with a peripheral cover 64, of rubber or other similar material, in order to prevent the stay members from becoming wedged in being placed in the recesses provided therefor in the periphery of the drum.

From the foregoing description of the manner in which the shafts 45 and 52 are driven, it will be apparent that the revolution of these shafts is in the same direction and as indicated in Fig. 4, the stay members are located in the recesses in the periphery of the drum when the drum is descending, while the corresponding movement of the periphery of the auxiliary drum 63 is ascending, so that there is a tendency in the operation of these parts to cause a continual agitation of the stay members as the same are placed in the recesses in the drum 54.

The right hand portion of these stays, as indicated in Fig. 4, tend to work down into the recesses in the periphery of the drum 54, while the left hand portion of the stays or its cover over the auxiliary drum 63 tend to work up or in the opposite direction, thus, as hereinbefore stated, preventing any tendency of the stay members becoming wedged while being fed to position in the recesses in the periphery of the drum 54.

Each hopper member is provided with a bracket 65 provided with a bearing in which it is journaled on a shaft 66 extending between and journaled in suitable bearings provided therefor in the main side frames 20 and 21. The lower portions of the hopper members are fitted to cover the upper portions of the drum frame 58 and the auxiliary drum 63, as clearly indicated in Fig. 4, and furthermore, as will be hereinafter more particularly described, the hopper member 57, as well as other parts of the machine, are adjustable to position laterally or crosswise thereof.

Immediately beneath the flattened lower surface of the drum frame 58, and appreciably spaced therefrom in a parallel position, a table 67 is provided, upon which, through the delivery opening in the bottom of the drum frame 58, the stay members are delivered in a superimposed pile, there being two more stay members in this delivery opening at all times during the operation of the machine.

The space between the flattened bottom portion of the drum frame and the table 67 is approximately the same as the thickness of the stay members, and within this space there are a series of suitably placed reciprocating pusher rods 68. Each of these is connected at one end to a shaft 69, mounted in the lower ends of the lever arms 70, which are mounted on a shaft 71, and also suitably secured on the shaft 71 is a lever arm 70′. On the drive shaft 28, there is a cam 72 having a cam groove 73, and mounted on a shaft 75 is an arm 74 provided with a roller 76 traveling in the groove 73 of the cam 72. A connecting rod 77 is pivotally connected at one end in the arm 74, as indicated at 78′, and at its opposite end in the outer end of the lever arm 70′, as indicated at 79′.

By this mechanism, as will be understood, through the revolution of the cam 72, the arm 74 is rocked and moves the connecting rod 77, which, in turn, swings the lever arm 70′, rocks the shaft 71, as well as the lever arms 70, to reciprocate the pusher rods 68, in order that by so doing one stay at a time may be removed from the superimposed pile and delivered to its place in the receptacle provided therefor on the endless conveyers, as hereinafter described.

We also employ pairs of rocker frames, indicated at 78 and 79, which are located respectively adjacent the inner sides of the main frames 21 and 20, as well as conveyer frames 80 and 81, the conveyer frame 80 being adjustable to position laterally or crosswise of the machine while the conveyer frame 81 is not so adjustable.

82 and 83 indicate guide track frames located respectively beneath the conveyer frames 80 and 81, the guide track frame 82 being adjustable to position laterally of the machine, while the guide track frame 83 is not so adjustable.

A shaft 84 passes through bearings provided therefor in the main side frames 20 and 21, and also through bearings provided therefor in the rocker frames 78 and 79 and the conveyer frames 80 and 81. Frame tie rods 85 and 86 extend between and are suitably connected in the rocker frames 78 and 79, and pass through the conveyer frames 80 and 81, while frame tie rods 87, 88, and 89 similarly extend between and are connected to the rocker frames 78 and 79, and pass through the guide track frames 82 and 83.

Journaled in bearings provided therefor, at one end of the conveyer frames 80—81, is a shaft 90. This shaft is provided with sprockets 91, and being alike, otherwise than laterally adjustable to position in the machine, but one of the conveyers and conveyer frames will be described.

92 indicates an endless conveyer which passes over the sprocket 91, at one end of a conveyer frame, as hereinbefore described, and also over a sprocket 93 at the other end thereof. The sprocket 93 is journaled on a shaft 93′, in a bearing block 94, made to fit within the bifurcated or forked end 95 of the conveyer frame 81, which is provided with a lug 97 and an adjusting screw 96, in order to adjust the bearing block 94 to the required position to obtain the desired tension in the endless conveyer 92.

In suitable position on each endless conveyer, the same is fitted with a plurality of stay carriers, each of which is indicated at 98. As shown in the drawing, these stay carriers are connected to the pivotal connections between alternate links of the conveyer chain, but as will be understood, they may be otherwise spaced, if so desired.

Each stay carrier is provided with projections, pins, or other similar devices 99, between which, as will be understood, a pocket is provided for the reception of the stays as the same are delivered from the opening in the under side of the drum frame 58.

The endless conveyers are caused to move a predetermined distance intermittently by a gear 100 mounted on the shaft 90, and meshing with a gear 101 mounted on the frame rod 85, on which there is also a gear 102 meshing with a gear 103 on the shaft 84. The shaft 84 is also provided with a gear 104 which meshes with a gear 105 mounted on a shaft 106 journaled in the main side frames 20 and 21.

In a suitable position, the shaft 106 is also provided with a ratchet wheel 107, engaged by a pawl 108 pivotally mounted between the corresponding ends of the levers 109, which are also journaled on the shaft 106. Between the opposite end of these levers 109, one end of a link 110 is pivotally connected, while the other end of the same is pivotally connected to one end of an arm of a bell crank lever 111. This bell crank lever is mounted on a shaft 112 and at the end of its other arm is provided with a roller 113 adapted to bear against the face of a cam wheel 114, also mounted on the shaft 28. The roller 113 is maintained in position against the face of the cam 114 by means of a spring 115, or otherwise.

By this mechanism, as hereinbefore stated, the conveyer chains are caused to move a predetermined distance every time the cam, operating through the bell crank lever, link, and pawl, causes the ratchet to turn a predetermined portion of a revolution, and as the conveyer chains are moved the stay members are discharged from the opening in the under side of the drum frame 58 by the pushers 68 and slide on the member 116 into position in the pockets or other receptacles provided therefor between the pins or projections 99 on the stay carriers 98.

For a purpose hereinafter explained, the frames 78 and 79, as well as the conveyer frames 80 and 81, and the parts associated therewith, together with the guide track frames 82 and 83, and the parts associated therewith, are caused to rock on the shaft 84 and to be returned to their normal positions once during each revolution of the main drive shaft 28. These parts are so operated by the following mechanism: On the main drive shaft 28 there is a cam 117, and there is provided an arm 118 mounted on a shaft 119 and fitted at its free end with a roller 120 adapted to bear against the face of the cam 117. A connecting rod 121 is pivotally connected at one end to the arm 118 and at its opposite end to one end of a lever arm 122, which is secured on a shaft 123, suitably journaled in bearings provided therefor in the main side frames and the auxiliary side frame 36. Also secured to each end of the shaft 123 is a lever arm 124. At its upper end each lever arm 124 is bifurcated, as indicated at 125, and adapted to span the frame rod or shaft 89.

From the description of these parts it will be apparent that as the cam 117 forces the lever arm 118 from the position shown in full lines to that shown in dotted lines in Fig. 6, the connecting rod 121 will be moved correspondingly from left to right, swinging the lever arm 122 in the same direction, rocking the shaft and swinging the lever arms 124 in a corresponding direction, which latter cause the rocker frames, conveyer frames and guide track frames to swing or turn the shaft 84 so that the conveyer frames and conveyers will be raised at the right-hand end as shown in Fig. 6, and lowered at the left hand end to their normally tilted positions as indicated in dotted lines therein. These parts are moved to the other position when the roller 120 bears against the recessed portion of the face of the cam 117, by means of a spring 126, which carries the lever arm 122 to its other position, and of course this member carries the other parts with it.

We also employ an endless conveyer 127 for feeding the tape or material from which the covers of the stay units are carried to the machine. This conveyer 127 passes around sprockets 128 and 129, which are mounted horizontally in suitable standards adjacent the corresponding ends of the main side frames, and one of which standards is indicated at 130 in Figs. 1 and 6.

We also employ a gripper member connected to the conveyer 127. By reference to Figs. 1 and 6 it will be seen that this gripper member preferably comprises an upright 131 fitted with a bracket 132 on one side, by which the same is connected to the conveyer 127. At its lower end, each upright 131 is fitted with a roller 133, adapted to run upon a track 134, suitably mounted in the frame of the machine. Each upright 131 is also provided with a jaw member 135, this member being the stationary jaw of the gripper.

136 indicates the movable jaw of the gripper member, and is pivotally connected to the upright 131 thereof and provided with an extension 136', between which and the upper bracket member there is a spring 137 for normally maintaining the jaws of the gripper member in contact with each other or in a closed position.

On the standard to which the sprocket 128 is mounted, there is also connected a cam 138, beneath which the free end of the movable jaw of each gripper member passes and is depressed against the action of the spring 137, in order to open the jaws of the gripper to receive the strip of material to be fed to the machine to form the cover members for the stay units. This material is preferably fed from a spool or roll supported on a frame provided for this purpose, and is passed over a slotted arm 139 and beneath a roller 141, both mounted in a frame 140 suitably and adjustably secured on a shaft 142 as shown in Fig. 5.

The strip of material forming the covers for the stay units is fed a predetermined distance by each gripper member, depending upon the position of the adjustable hopper 57 and its associated parts, when as hereinafter described the tape is positively held in association with a predetermined number of stay members, and when the gripper has reached this predetermined position, depending of course upon the desired length of the strip for forming a stay unit of a given length, the strip of material pulls through the gripper and is so released.

When so fed for the proper length, and while in the proper position, the strip of material forming the covers is cut transversely by a cutter wheel 143. This cutter wheel is mounted on a conveyer shaft 90 so as to turn therewith, and is provided with series of flattened cutting edges 144 and intermediate curved edges 145, as is clearly indicated in Fig. 5.

By reference to Figs. 5 and 5$^a$ it will be seen that we employ a knife blade 146 acting as a shears with the sharpened portions of the cutter wheel to sever the strip of cover material, and a presser foot 146' for each endless conveyer 92. The knife blade 146 is carried by an arm 147, and each presser foot 146' by an arm 147'. The arm 147 and the arms 147' are secured on a shaft 148. An arm 149 is also secured to this shaft 148, and is pivotally connected to one end of a connecting rod 150. The opposite end of this connecting rod 150 is pivotally mounted in an arm 151, also secured on the shaft 75'. At its opposite end, this arm 151 is fitted with a roller 152 adapted to travel in a cam groove 153 in the face of cam 154, which latter is secured on the main drive shaft 28.

By this mechanism, as will be apparent, through the revolution of the cam 154, the arm 151 is swung, and by moving the connecting rod 150 swings the arm 149, thereby the shaft 148 and raising the presser feet 146', to their normal positions, and also actuating the knife blade 146 to co-act with a cutting edge of the cutter wheel 143 to sever a strip of the cover material.

As hereinbefore described, the stay members are fed to the pockets provided therefor between the pins or projections on the stay carriers 98, and in the further travel of the conveyers these stay members, so placed, are maintained in position in their pockets by a guard 155 partially surrounding the conveyer sprockets 91.

When each stay carrier reaches a position immediately beneath the conveyer shaft 90, the stay members are freed from the guard and each presser foot 146' raised to receive a severed strip of material to form a cover for the stays placed in position on the same and as hereinafter described, by forcing the pins or other projections into and through the said strip of material, the stays and strip will be maintained in this position by the pins or projections until the pins or projections are withdrawn.

The conveyer 127, which carries the gripper is driven from the shaft 34, which in turn is driven from the main drive shaft through the sprockets 32 and 33 and the drive chain 37. At the end of the shaft 34 opposite to which the sprocket 33 is attached, the same passes through a sleeve 156, and at the end of the shaft 34 it is fitted with a gear 157, forming part of a differential drive.

The sleeve 156, at one end thereof, is also provided with a yoke member 158, and on the sleeve 156 there is a worm wheel 159 meshing with a worm gear 160 mounted on one end of a shaft 161 for a purpose to be hereinafter described.

At the ends of the yoke member 158, there are journaled gear shafts 162 and 164. These gear shafts, respectively, carry the gears 163 and 165, both meshing with the gear 157 and with a gear 166 mounted at the end of a shaft 167, in alinement with the shaft 34, so that ordinarily the shaft 167 is turned by a shaft 34 through the said gears 157, 163, 165 and 166.

At the opposite end of the shaft 167, there is a worm gear 168 meshing with a worm wheel 169, connected to the spindle to which the sprocket 129 is connected, and over which, as hereinbefore described, the gripper chain 127 passes.

Connected to the guide track frames 82 and 83, there are suitable tracks for maintaining the stay members, and the fabric material forming the covers therefor, in straight-line positions while being advanced by the conveyers, hereinbefore described, for moving the same.

These track members are indicated at 170 and 171, these particular tracks lying immediately beneath the conveyers 92 and extending from the sides of the presser feet 146', which, when in a raised position, form continuations for these tracks, at one end thereof, to a point at their other ends, which extend an appreciable distance over the adjacent edge of the sewing machine plates, to be hereinafter described.

Also connected to the guide track frames 82 and 83 there are outer guide tracks 172 and 173, the former being connected to the guide track frame 82 and the latter to the guide track frame 83. The guide track 172, on the right hand end thereof, as shown in Fig. 2, is provided with an overlying member 174, provided along its inner edge with a groove 176 for the reception of the ends of the stay members in the overturned ends of the covers, as hereinafter described, while similarly the outer guide track 173 is provided with an overlying member 175 on the corresponding end thereof and likewise fitted with a groove 177 for the reception of the opposite end of the stay members and the folded-over end of the covers.

These guide track members, as will be understood, at the right hand ends thereof, as shown in Figs. 1 and 2, also overlap the sewing machine plates to the same extent as the guide tracks 170 and 171, for purposes likewise to be hereinafter described, and at their opposite ends the guide tracks 172 and 173 extend to a position approximately to the point beneath the conveyer sprockets 91, at which the covers are applied to the stays, as hereinbefore described.

When the covers are so applied to the stays, as will be understood, the opposite ends thereof extend appreciable distances beyond the ends of the stays and in a position parallel therewith.

In completing these stay units, made in accordance with our invention, the ends of the covers are folded over the ends of the stays before the same are sewed in position, and therefore we also provide a mechanism for folding the ends of the covers over their respective stays. Obviously it is necessary to provide two such mechanisms, one for each end of the stay members, but inasmuch as these devices are alike, except being right and left, but one of them will be described, and that the one operating in connection with the guide track 173. These devices are as follows, particular reference being made to Figs. 7 and 7ª: On the main drive shaft 28, there is a cam 178 provided in one face thereof with a cam groove 179. On the shaft 181, suitably journaled in the frames of the machine, there is an arm 180. At its upper end, the arm 180 is fitted with a cam roller 182 operated in the groove 179 of the cam 178, and at its opposite end and below the shaft 181 a connecting rod 183 is pivotally connected thereto.

At its opposite end, the connecting rod 183 is pivotally connected to one end of an arm 184, mounted on a shaft 185, on which there is also mounted a worm wheel 186. This worm wheel meshes with a worm gear 187 mounted on the shaft 188 journaled in bearings 189 and 190, which, in turn, are connected to bearings in which the shafts 191 and 192 are journaled, the shaft 188 extending lengthwise of the machine and the shafts 191 and 192 extending transversely thereof, and being suitably journaled in the machine frames.

On the shaft 188 there is also mounted a sleeve 193 extending from which there is an arm 194. 195 represents a folder member, which, at one end, is pivotally connected, as indicated at 196, to the end of the arm 194. This folder member, at its opposite end, is provided with a hook 197, adapted when moved through the mechanism hereinbefore described, to enter a recess 198 provided therefor in the edge of the guide track 173 to engage the end of a cover and fold the same over the corresponding ends of the stay members.

Pivotally connected in the guide member 173 is a short screw rod 199, on which there is a collar 200 provided with trunnions 201, which engage in slots 202 provided in the opposite sides of the folder member 195, so that as the arm 194 is swung toward the center of the machine, the folder member is raised, as well as moved inwardly to fold the end of the cover member over the corresponding ends of its stay members.

In the further movement of the conveyers, after this folding has been effected, the ends of the stay members, with the covers turned over the same, are carried into the grooves 176 and 177 in the edges of the guide tracks 174 and 175, within which grooves they travel and are maintained in this condition until delivered therefrom to position on sewing machines, in which the sewing takes place, as hereinafter described.

As shown and described, we also employ a pair of sewing machines, one of which is fixed in position and the other of which is adjustable to position laterally of the machine. The bed of the fixed machine is indicated at 203, its head frame at 204, and its face plate at 205, while the head frame of the adjustable machine is shown at 206 and its face plate at 207.

The head frames of both machines are supported on shafts 208 and 209, which are suitably journaled in the main side frames of the machine. The face plates of both machines, on their left hand edges, as shown in Fig. 6, are of reduced thickness, as indicated at 210, and over this reduced portion of these plates the adjacent ends of the guide tracks 174, 170, 171 and 175 extend, so that when in their normal positions the surfaces of these parts are in the same plane.

Between the overlapping portions of the face plates of the sewing machines and these guide tracks, there is an appreciable space or recess, indicated in Fig. 1 at 211, the purpose of which will be hereinafter explained.

The operating shaft of the fixed sewing machine is driven from the shaft 31' by means of a worm wheel 212 mounted thereon and meshing with the worm gear 213 on the operating shaft on the machine. Similarly, the operating shaft of the adjustable machine is driven by the worm wheel 214 mounted on the shaft 31', and meshing with the worm gear 215 on the operating shaft of the adjustable machine.

On the main drive shaft 28, there is also a cam 216, bearing against the surface of which is a cam roller 219, carried at the end of one arm of a lever 217 mounted to rock on the shaft 218. The roller 219 is maintained against the face of the cam 216 by means of a spring 217' or otherwise, one end of the spring 217' being connected to the lever 217 as illustrated, while the opposite end of the spring is suitably secured in the frame of the machine. The opposite end of the lever 217 operates a suitable clutch 220 for connecting and disconnecting the sewing machine shafts 31 and 31'. The clutch comprises a collar 265 fixed on the shaft 31' and fitted with a suitable casing 266 in both of which there is a circumferential groove 267. At one end the collar and casing are provided with a head 268 and in the collar 265 and within the casing 266 there is a longitudinal recess 269 adapted to receive a bolt 270. The bolt slides within the longitudinal recess and is normally projected therefrom at one end by a spring 271 acting against the head 268. In the outer surface of the bolt 270 there is a transverse recess 272 at one side of which the wall defining the same is beveled as indicated at 273. On the shaft 31, adjacent the end of the shaft 31' a collar 274 is fixed and at one end is provided with a lug 275 which contacts with the end of the bolt 270 when projected to turn the shaft 31' from the shaft 31. This is illustrated in Fig. 9ª. By reference to Fig. 9 it will be seen that the bolt 270 is drawn into the longitudinal recess by the end of the lever 217 when lifted so as to enter the circumferential groove 267 and the transverse recess in the bolt. This occurs when the roller 219 runs onto the depression in the face of the cam 216 so that when in the dotted line position in this figure, the bolt is withdrawn and the shoe 221 carried by the lever 217 bears against the periphery of the brake wheel 222 mounted on the shaft 31' to stop the same, and when the roller 219 passes to the raised surface of the cam 216, the lever 217 will be moved to its full line position Fig. 9, in which the end of the lever is withdrawn from contact with the bolt thereby permitting the spring 271 to throw the bolt and the lug 275 on the collar 274 to turn the shaft 31' and thus operate the sewing machines.

By reference to Fig. 10, it will be seen that we also provide, for each machine, a cam projection 223 on the main drive shaft 28. Bearing against this cam projection and a portion of the periphery of the shaft 28, is a roller 224, mounted in one end of a lever 225. The lever 225 is mounted to swing on a shaft 226, and the opposite end 227 of this lever is adapted to operate the presser foot on the machine with which it is employed to raise and lower the same as required in the sewing operation. The roller 224 is maintained against the shaft 28 and the cam 223 by means of a spring 225' which at one end may be secured to the lever 225 and at its opposite end suitably fixed in the frame of the machine. This, it is believed, will be understood without further description.

As shown in Fig. 2, we also provide a shaft 228 extending between and journaled in the main side frames of the machine, and on this shaft, for each sewing machine, we provide a sleeve 229, and inasmuch as these parts are duplicates in each machine, but one of them will be described, the same being employed for operating the pusher rods to remove the finished stay from the position in which it is sewed.

Each sleeve 229 is fitted with a beveled gear 230, meshing with a corresponding beveled gear 231 secured to the under face of a cam 232, mounted to turn on a stud shaft 233, the stud shaft being suitably secured in the bed frame of the sewing machine. Bearing against the periphery of the cam 232 is a roller 234 carried at one end of the lever 235, which is pivotally mounted at 236 in the face plate of the sewing machine. The end of the other arm of the lever 235 is suitably connected to a pusher rod 237 set and adapted to reciprocate within a recess provided therefor in the face plate of the sewing machine with which it is associated.

After the sewing of the stay units has been completed, the pusher rods 237 are actuated by the mechanism just hereinbefore described, to remove the completed stay unit. At this time, the rocker frames and associated parts have been swung from their substantially horizontal position to that in which the right hand end of the same, as viewed in Figs. 1, 2 and 3, is raised, when, as will be understood, the ends of the guide tracks are raised from the face plates of the sewing machines a sufficient distance to permit the pusher rods 237 to force the finished stay from the position in which it was sewed off the edge of the face plate of the machine onto the surface of the reduced portion, indicated at 210, so that when the rocker frame and associated parts are returned to their normal substantially horizontal positions, the ends of the guide tracks cover the stay units, which are then between these ends of the guide tracks and the adjacent surface of the reduced portions of the face plates of the sewing machines, when in turn, as the stay units are sewed and thus forced into this space between the ends of the guide tracks and the reduced portions of the face plates of the machines, they are pushed off by the pusher rods and fall into a receptacle 238 provided therefor, which rests on the base of the machine, as shown in Fig. 1.

In order that the threads may be moved away from the straight line position, in order to facilitate the sewing of the next succeeding stay unit, we provide a thread mover 239. At one end this is secured to the under side of the cam 232 and revolves therewith, and at its opposite end it is formed in the arc of a circle, this portion coming beneath the throat plate of the machine so as to properly move the threads from the straight line position after being severed, when each sewing operation is completed.

We also employ a thread cutter 240 co-acting with the thread mover to cut the threads. The thread cutter 240 is secured to an arm 241 pivoted at one end on the throat plate of the sewing machine, as indicated at 242, and provided with a cam roller 243, against which the projection on the cam 232 strikes and swings the arm 241, as well as the thread cutter 240, causing the same at the proper time to co-act with the thread mover 239 to cut the threads.

The shaft 228 and the parts hereinbefore last described, associated with and actuated by the same, is revolved from the main drive shaft 28 by means of the gears 244 and 245, which mesh with one another, the former being mounted on the shaft 228 and the latter on the main drive shaft 28.

In order to provide for the making of stay units of different lengths, as hereinbefore stated, one sewing machine, one conveyer frame, one part of the hopper, and one of the folder members are made adjustable to position laterally of the machine, and in order that the adjustment of these parts may be uniform and simultaneous, we employ a shaft 246, journaled in the main side frames, and one end of which is screw threaded. The screw threaded end of this shaft passes through the main side frame 21, and exteriorly thereof is fitted with a hand wheel 247.

On the shaft 246, there is also a sprocket wheel 248. Over this sprocket wheel 248, as well as over a sprocket wheel 249, mounted on the shaft 84, there is a chain 250, so that by turning the hand wheel 247, the shaft 84 is turned with the shaft 246. The screw threaded end of the shaft 246 engages a correspondingly screw threaded portion in the base of the adjustable sewing machine, so that by the turning of this shaft the adjustable sewing machine may be moved laterally on the shafts 208 and 209. The end of the shaft 84 passing through the main side frame 21 is also screw threaded and this screw threaded end of the shaft 84 engages a correspondingly screw threaded portion of the conveyer frame 80, so as to move this conveyer frame to a position laterally of the machine, carrying with it the associated parts, namely the adjustable conveyer, the adjustable guide track frame 82, and the guide tracks 170, 172, and its extension 174.

Also mounted on the screw threaded end of the shaft 84 is a sprocket 251, passing over which is a chain 254, which also passes over a sprocket 252 mounted on the shaft 66 journaled in bearings provided therefor in the main side frames. The end of the shaft 66 which passes through the main side frame 21 is also screw threaded, and this screw threaded end of the shaft 66 also passes through and engages the correspondingly screw threaded portion provided therefor on the bracket 65 of the adjustable hopper 57, so that the shaft 66 is turned in unison with the shafts 84 and 246, and the hopper moved to its adjustable position uniformly with the adjustable conveyer frame and the adjustable sewing machine.

On the shaft 84, exteriorly of the main frame 21 there is a gear 255. This gear meshes with a gear 256 mounted immediately beneath it on the shaft 89, and this latter gear, namely, the gear 256, meshes with a gear immediately beneath it on shaft 123 and on the other side of the machine a gear 257 is mounted on the shaft 123. The gear meshes with gears 258 and 259, mounted respectively on the corresponding ends of the shafts 191 and 192.

The ends of the shafts 191 and 192 which pass through the main side frame 21 are also screw threaded, and on these shafts, as hereinbefore described, are mounted the rocker arms for actuating the folder members, and as will be understood by the revolution of these shafts 191 and 192 the rocker arm for the adjustable folder is moved to position corresponding to that assumed by the other adjustable parts.

As clearly indicated in Fig. 11, on the end of the shaft 191, adjacent the main side frame 21, the same is fitted with a spiral gear 260. This meshes with a spiral gear 261 on the adjacent end of the shaft 161 so that through the revolution of the shaft 191 the shaft 161 is turned and by turning the worm 160 the worm gear 159 is turned and the sleeve 156 upon which it is mounted will turn causing the bevel gears 163 and 165 mounted in the yoke member 158 to turn with it. These bevel gears meshing with the bevel gear 157 which is pinned on the shaft 34 cause bevel gear 166 to turn, thus causing sprocket 129 to turn through the motion imparted to it by the spiral gear 168 on the end of the shaft 167 and the spiral gear 169. The reason for this, it will be understood, is to permit the gripper members which are fastened on the chain 127 to be adjusted laterally of the machine in relation to the adjustments of the other elements of the machine.

Shaft 34 which has bevel gear 157 on the end of it is stationary while the machine is being adjusted, thus causing the gripper unit 131—136 to move only in accordance with the adjustment for length.

Shaft 161 is stationary while the machine is operating thus allowing a transmission of rotation through bevel gear 157 and bevel gears 163 and 165, whose respective shafts are held stationary by the yoke member 158, to bevel gear 166 and shaft 167 and through spiral gears 168—169 to the sprocket 129. This sprocket, as will be understood, drives the chain 127 and the gripper unit 131—136 to draw the tape laterally across the machine.

These two motions will also work in conjunction with each other, allowing a movement of the driving units to work simultaneously.

It is also necessary to adjust one presser foot 146′ and the arm 147′, by which the same is carried to position with the other adjustable members of the machine, and this is accomplished by providing a bifurcated projection 263, see Fig. 1, extending from the guide track frame 82 into a recess provided therefor in the hub on which the arm 147′ is mounted on the shaft 148, which shaft, or that part of the same on which the arm 147′ is thus adjustable, is square and the opening in the hub made to receive the same.

In the operation of the hereinbefore described machine the stay members are placed in the hopper and extend between the parts 56 and 57 thereof. The stay members, by gravity, work themselves down into position in the recess provided therefor in the periphery of the drum 54, from which they are successively delivered by the pusher rods 68 into position in the stay carriers 98.

As the endless conveyers are intermittently advanced, they carry the stay members, thus placed in the stay carriers, over the conveyer sprockets 91 to the position shown in Fig. 5ª, in which they rest upon the surfaces of the presser feet 146′ forming continuations of the guide tracks 170 and 171, and across which the tape material, to form the cover, has been placed.

The tape material, as hereinbefore stated, is fed from a spool or drum by the grippers carried by the gripper conveyer 127, and when properly placed, this cover tape is cut by the shear member 146 secured to the end of the arm 147, acting in conjunction with a sharpened edge 144 of the cutter member 145, acting in the nature of a shears.

At this time, the rocker frames, conveyer frames, and associated parts are rocked about the shaft 84, from the position shown in dotted lines, Fig. 6, to approximately that shown in full lines therein, and in so tilting the conveyer frames and the parts associated therewith, the left-hand end is raised and when returned or tilted in the opposite direction forces the strip of cover material into positive engagement with the stay members with which it is to be associated, by forcing the pins or projections 99 on the stay carriers through the strip of cover material. This also is clearly indicated in Fig. 5ª.

During the intermittent movement of the conveyers, the stay members and strip of cover material to be associated therewith, are moved along the guide tracks 170—171—172 and 173, until they reach a position in alinement with the folder members. This, as will be understood, is after the conveyer frames and associated parts are in a substantially horizontal position. The folder members are then actuated to fold ends of the strip of cover material over the ends of the stay members, and when so folded the further intermittent movement of the conveyers causes the ends of the stay members, with those portions of the strip of cover material folded over the same, to enter the slotted or grooved edges of the raised or superimposed parts 174 and 175, as hereinbefore described.

In this position, the stay members, with the associated strip of cover material, are delivered to the sewing machines to positions to be sewed, when the presser feet of the sewing machines are actuated to hold the stay members and cover strip in position, at which time the conveyer frames and associated parts are rocked to their normally tilted positions so that the pins or projections 99 and stay carriers are withdrawn from the strip of material to form a cover, and this end of the conveyer frames being raised they will not interfere with the operation of the sewing machine. In this position, the strip of material is sewed along lines of sewing exterior of the outer stay members, and also intermediate of the stay members, irrespective of the number of the same which may be employed in any given stay unit, the required number of needles being employed in each sewing machine for this purpose.

After the sewing has been completed, the presser feet of the sewing machines are raised and the thread cutter and mover operated, and the pusher rods 237 also actuated to move the completed stay unit from position on the sewing machines. At this time, also the conveyer frames and associated parts are in their tilted positions, so that the pusher rods 237 move the completed stay unit sufficiently far to cause the same to fall upon the surface at the reduced edge 210, of the face plates of the machine, whereupon, at the return of the conveyer frames and their associated parts to their substantially horizontal position, the ends of the guide tracks cover the finished stay units which lie within the space or recess 211, between these ends of the guide tracks and the reduced edge of the face plates of the machines, and from which space the completed stay units are forced and drop into the receptacle 238 provided therefor.

The sewing machines, as will be understood, are started and stopped at the proper times to effect the sewing, as hereinbefore described, and as will be understood the shaft 246 may be turned by the hand wheel 247 to set the adjustable part of the machine in any desired position, depending upon the length of the stays and consequently the stay units to be made by the machine.

We claim as our invention.

1. In a machine of the class described, a conveyer, devices for intermittently moving the conveyer, devices for placing corset stay members on the said conveyer when at rest, means for placing a strip of cover material in position to receive a predetermined number of corset stay members on the conveyer, and means for securing the predetermined number of corset stay members in place in the strip of cover material to form a corset stay unit.

2. In a machine of the class described, a conveyer, means for imparting a regular intermittent movement to the said conveyer, devices for feeding a strip of cover material to position on the said conveyer, devices for placing a predetermined number of corset stay members upon said strip of material on the conveyer between the movements thereof, means for folding the ends of said strip of material over the ends of the corset stay members, and means for securing the predetermined number of corset stay members in place in the strip of cover material to form a corset stay unit.

3. In a machine of the class described, a hopper for receiving corset stay members, a conveyer, means for imparting a regular intermittent movement to the said conveyer, devices for successively removing corset stay members from the said hopper and placing a predetermined number of the same upon the said conveyer, means for placing a strip of cover material in position to receive a predetermined number of corset stay members, and sewing machines for sewing the predetermined number of corset stay members in position in the strip of cover material to form a corset stay unit.

4. In a machine of the class described, a hopper for receiving corset stay members, a conveyer, means for imparting a predetermined intermittent movement to the said conveyer, devices for removing corset stay members from the said hopper and successively placing a predetermined number of the same on said conveyer, means for placing a strip of cover material in position relatively to a predetermined number of corset stay members, devices for folding the ends of the strip of cover material over the ends of the predetermined number of corset stay members, and means for securing the predetermined number of corset stay members in position in the strip of cover material to form a corset stay unit.

5. In a machine of the class described, a hopper for receiving corset stay members, a conveyer, means for imparting a predetermined intermittent movement to the said conveyer, devices for removing corset stay members from the said hopper and successively placing a predetermined number of the same on said conveyer, means for placing a strip of cover material in position relatively to a predetermined number of corset stay members, devices for folding the ends of the strip of cover material over the ends of the predetermined number of corset stay members, and sewing machines for forming lines of sewing along the sides of said corset stay members through the said strip of cover material to maintain the corset stay members in position therein to form a corset stay unit.

6. In a machine of the class described, a hopper comprising a fixed member and an adjustable member, a conveyer frame immovable laterally of the machine, a conveyer carried thereby, a conveyer frame adjustable to position laterally of the machine, a conveyer carried thereby, devices for removing corset stay members from said hopper and successively placing the same in position on the said conveyers, means for feeding a strip of cover material to position and associating the same with a predetermined number of corset stay members, means for securing the corset stay members in position in the strip of cover material to form a corset stay unit, and means for determining the position of said adjustable members laterally in the machine to produce corset stay units of different lengths.

7. In a machine of the class described, a hopper comprising a fixed member and a member adjustable laterally of the machine, a conveyer frame immovable laterally of the machine, a conveyer carried thereby, a conveyer frame adjustable to position laterally of the machine, a conveyer carried thereby, means for imparting a predetermined intermittent movement to the said conveyers, devices for removing the corset stay members from the said hopper and successively placing the same in position on said conveyers crosswise thereof, means for feeding a strip of cover material to the position beneath said conveyers and associating the same with a predetermined number of corset stay members, means for securing said predetermined number of corset stay members in position in the strip of cover material, and means for moving the said adjustable members laterally in the machine to determine their position for the production of corset stay units of a predetermined length.

8. In a machine of the class described, a hopper comprising a fixed member and a member adjustable laterally of the machine, a conveyer frame immovable laterally of the machine, a conveyer carried thereby, a conveyer frame adjustable to position laterally of the machine, a conveyer carried thereby, means for imparting a predetermined intermittent movement to the said conveyers, devices for removing the corset stay members from the said machine and successively placing the same in position on said conveyers crosswise thereof, means for feeding a strip of cover material to the position beneath said conveyers and associating the same with a predetermined number of corset stay members, a sewing machine immovably fixed in said machine, a sewing machine adjustable to position laterally in said machine, means for actuating the said sewing machines to secure a predetermined number of corset stay members in position in said strip of cover material, and means for moving the said adjustable members laterally in the machine to determine their position for the production of corset stay units of a predetermined length.

9. In a machine of the class described, a hopper comprising a member fixed in position in said machine and a member adjustable to position laterally of the said machine, a conveyer frame immovable laterally of the machine, a conveyer carried thereby, a conveyer frame adjustable to position laterally of the machine, a conveyer carried thereby, means for imparting a regular predetermined intermittent movement to the said conveyers, devices for removing corset stay members from the said hopper and successively placing a predetermined number of the same on the said conveyers crosswise thereof, means for feeding a strip of cover material to position and associating the same with a predetermined number of corset stay members with the ends thereof extending beyond the ends of the said corset stay members, devices fixed in position laterally of the machine for moving one end of the strip of cover material over the corresponding end of the predetermined number of corset stay members, devices adjustable laterally to position in the machine for folding the other end of the strip of cover material over the other ends of the predetermined number of corset stay members, means for securing the corset stay members in position in said strip of cover material, and means for simultaneously moving the said adjustable members to position laterally of the machine to determine the length of the corset stay units to be produced.

10. In a machine of the class described, a hopper comprising a member fixed in position in said machine and a member adjustable to position laterally of the said machine, a conveyer frame immovable laterally of the machine, a conveyer carried thereby, a conveyer frame adjustable to position laterally of the machine, a conveyer carried thereby, means for imparting a regular predetermined intermittent movement to the said conveyers, devices for removing corset stay members from the said hopper and successively placing a predetermined number of the same on the said conveyers crosswise thereof, means for feeding a strip of cover material to position and associating the same with a predetermined number of corset stay members with the ends thereof extending beyond the ends of the said corset stay members, devices fixed in position laterally of the machine for moving one end of the strip of cover material over the corresponding end of the predetermined number of corset stay members, devices adjustable laterally to position in the machine for folding the other end of the strip of cover material over the other ends of the predetermined numbers of corset stay members, a sewing machine fixed in position laterally of said machine, a sewing machine adjustable to position laterally of the said machine, devices for actuating the said sewing machines to form lines of sewing in the folded ends of the strip of cover material, along the edges of said corset stay members to secure the same in position therein, and means for simultaneously moving the said adjustable members to position laterally of the machine to determine the length of the corset stay units to be produced.

11. In a machine of the class described, a hopper for receiving the corset stay members, a conveyer, a revoluble drum having a grooved periphery for successively receiving the corset stay members from the said hopper, and successively delivering the same to the said conveyer, devices for feeding a strip of cover material and associating the same with a plurality of corset stay members, and devices for securing said plurality of corset stay members in position in said strip of cover material to form a corset stay unit.

12. In a machine of the class described, a hopper for receiving corset stay members, a conveyer, means for imparting an intermittent movement to the said conveyer, a drum having a grooved periphery for removing the corset stay members from the hopper, a drum frame surrounding the said drum, and provided with an opening through which the corset stay members are successively discharged, means for positively delivering the corset stay members successively to the said conveyer, means for feeding a strip of cover material and associating the same with a plurality of corset stay members, and means for securing the plurality of corset stay members in the strip of cover material to form a corset stay unit.

13. In a machine of the class described, a hopper for receiving corset stay members, a conveyer, means for imparting an intermittent movement to the conveyer, a drum having a grooved periphery for successively removing corset stay members from the hopper, a drum frame surrounding the said drum for maintaining the corset stay members in position in the grooves of the periphery of the drum, and having a flattened bottom in which there is a discharge opening for the corset stay members, a table beneath the flattened portion of the drum frame, upon which the corset stay members are successively deposited, pusher rods, means for actuating the pusher rods to positively deliver the corset stay member to position on the said conveyer, means for feeding a strip of cover material and associating the same with a predetermined number of corset stay members, and devices for securing the predetermined number of corset stay members in position in the strip of cover material to form a corset stay unit.

14. In a machine of the class described, a hopper for receiving corset stay members, a conveyer, means for imparting an intermittent movement to the conveyer, carriers for the corset stay members secured in spaced positions on said conveyer and provided with receptacles for the said corset stay members, means for removing the corset stay members from the said hopper and successively delivering the same to the receptacles provided therefor in the carriers on the said conveyer, means for feeding a strip of cover material and associating the same with a predetermined number of corset stay members while in the receptacles provided therefor on the said carriers, and devices for securing the predetermined number of corset stay members in position in the strip of cover material to form a corset stay unit.

15. In a machine of the class described, a hopper for receiving corset stay members, a conveyer, means for imparting an intermittent movement to the conveyer, a plurality of carriers secured on the said conveyer, pins secured in and projecting from each carrier, providing pockets between the same for the said corset stay members, means for removing the corset stay members from the hopper and successively delivering the same to position in the pockets between the said pins on the carriers, means for feeding a strip of cover material and forcing the same against a predetermined number of corset stay members while in position in the said pockets, and devices for securing the predetermined number of corset stay members in position in the strip of cover material to form a corset stay unit.

16. In a machine of the class described, a hopper for receiving corset stay members, a conveyer, means for imparting an intermittent movement to the conveyer, a plurality of spaced carriers secured to the conveyer, a plurality of pins secured in and projecting from each carrier, providing pockets between the same for the stay members, means for removing the corset stay members from said hopper and successively placing the same in the pockets provided therefor between the said pins on the said carriers, a gripper conveyer, means for actuating the same, a gripper secured to the said gripper conveyer, means for operating the gripper to grasp a strip of cover material and move the same to position relatively to a predetermined number of corset stay members in pockets in a carrier, and devices for securing a predetermined number of corset stay members in a strip of cover material to form a corset stay unit.

17. In a machine of the class described, a hopper for receiving corset stay members, a conveyer, means for imparting an intermittent movement to said conveyer, a plurality of carriers secured in spaced positions on the said conveyer and provided with pockets for receiving the corset stay members, means for removing the corset stay members from the hopper and successively depositing the same in the pockets provided therefor on the said carriers, devices for feeding a strip of cover material and associating the same with the corset stay members on one of said carriers with the ends of the strip of cover material extending beyond the ends of the said stay members, folder members for turning the ends of the cover material over the ends of the stay members, and devices for securing the predetermined number of stay members to a strip of cover material to form a corset stay unit.

18. In a machine of the class described, a hopper for receiving corset stay members, a conveyer, means for imparting an intermittent movement to the conveyer, a plurality of carriers secured in spaced positions to the conveyer and each provided with a plurality of pockets for the reception of the corset stay members, means for removing the corset stay members from the hopper and successively depositing the same in the pockets provided therefor on said carriers, a gripper conveyer, a gripper connected thereto and carried thereby, means for actuating the gripper to receive a strip of cover material and carry the same to position relatively to a predetermined number of stay members in a carrier with the ends of the cover member extending beyond the ends of a predetermined number of stay members, folder members for turning the ends of the cover strip over the ends of the predetermined number of stay members, guide members for maintaining the stay members in this position in the strip of cover material, and devices for securing the said stay members in said position in the strip of cover material to form a corset stay unit.

19. In a machine of the class described, a hopper for receiving corset stay members, a conveyer, means for imparting an intermittent movement to the conveyer, a plurality of carriers secured in spaced positions to the conveyer and each provided with a plurality of pockets for the reception of the corset stay members, means for removing the corset stay members from the hopper and successively depositing the same in the pockets provided therefor on said carriers, a gripper conveyer, a gripper connected thereto and carried thereby, means for actuating the gripper to receive a strip of cover material and carry the same to position relatively to a predetermined number of stay members in a carrier with the ends of the cover member extending beyond the ends of a predetermined number of stay members, folder members for turning the ends of the cover strip over the ends of the predetermined number of stay members, guide members for maintaining the stay members in this position in the strip of cover material, and a sewing machine for forming lines of stitches through the strip of cover material to maintain the stay members in position thereon to form a corset stay unit.

20. In a machine of the class described, a hopper for receiving corset stay members, a conveyer, means for imparting an intermittent movement to the conveyer, a plurality of carriers secured in spaced positions to the conveyer and each provided with a plurality of pockets for the reception of the corset stay members, means for removing the corset stay members from the hopper and successively depositing the same in the pockets provided therefor on said carriers, a gripper conveyer, a gripper connected thereto and carried thereby, means for actuating the gripper to receive a strip of cover material and carry the same to position relatively to a predetermined number of stay members in a carrier with the ends of the cover member extending beyond the ends of a predetermined number of stay members, folder members for turning the ends of the cover strip over the ends of the predetermined number of stay members, guide members for maintaining the stay members in this position in the strip of cover material, and a sewing machine for forming lines of stitches through the strip of cover material to maintain the stay members in position thereon to form a corset stay unit, and means for moving the corset stay unit off the sewing machine after the sewing operation.

21. In a machine of the class described, a hopper adapted to receive corset stay members, a conveyer, means for imparting an intermittent movement to the same, a plurality of carriers on said conveyer, a series of pins secured in and projecting from each carrier forming pockets between the same for the reception of stay members, means for feeding a strip of cover material beneath a stay carrier and associating the same with the stay members therein each time the said conveyer stops, means for folding the ends of the strip of cover material over the ends of the stay members, and means for securing the stay members in position in the strip of cover material to form a corset stay unit.

22. In a machine of the class described, a hopper for receiving corset stay members, a conveyer, means for imparting an intermittent movement to the conveyer, a plurality of carriers in spaced positions on the conveyer, a series of pins projecting from each carrier forming pockets between the same for the reception of the stay members, means for removing the stay members from the hopper and successively depositing the same in pockets provided therefor between the pins on said carriers, means for feeding a strip of cover material beneath a stay carrier, and associating the same with the stay members therein each time the conveyer stops, and devices for securing the stay members in the strip of cover material to form a corset stay unit.

23. In a machine of the class described, a hopper for receiving stay members, a conveyer, means for intermittently moving the same, a plurality of carriers in spaced positions on said conveyer, a series of pins secured in and projecting from each carrier, forming between the same pockets for the reception of the said stay members, means for removing the said stay members from the hopper and depositing the same successively in said pockets provided therefor between the pins on said carriers, means for feeding a strip of cover material to position beneath each carrier every time the conveyer stops, means for forcing the said pins through a strip of cover material when in its position, to thus associate the same with the said stay members in a given carrier, and means for securing the stay members in this position in the strip of cover material to form a corset stay unit.

24. In a machine of the class described, a hopper for receiving stay members, a conveyer, means for imparting an intermittent movement to the conveyer, a plurality of carriers in spaced positions on the conveyer, a series of pins secured in and projecting from each carrier, providing between the same pockets for the reception of the stay members, means for removing the stay members from the hopper and positively depositing the same in the pockets provided therefor between the pins on the said carriers, means for feeding a strip of cover material to position beneath one of said carriers every time the conveyer stops, a sewing machine, means for folding the ends of a strip of cover material over the ends of the corset stay members, means for forcing the pins in one carrier through one strip of cover material to associate the same with the stay members in said carriers and to withdraw the pins from the strip of material in another carrier as the same is deposited by the conveyer on said sewing machine, and means for actuating the sewing machine for securing the said members in position in the strip of cover material to form a corset stay unit.

25. In a machine of the class described, a hopper for receiving corset stay members, a conveyer, means for imparting an intermittent movement to the conveyer, a plurality of stay carriers, on said conveyer, a series of pins secured in and extending from each stay carrier, forming pockets between the same for the reception of the said stay members, means for removing the stay members from the hopper and positively depositing the same in the said pockets between the pins on the carriers, means for feeding a strip of cover material to position beneath a stay carrier every time the conveyer stops, a sewing machine, tracks over which the said strip of cover material and stay members are moved by the conveyer to the sewing machine, the said guide tracks at corresponding ends overlapping portions of the sewing machine plate with a space between the same, means for forcing pins in each stay carrier through the strip of cover material after the same has been placed in position by the aforesaid means for moving the same and for withdrawing the pins from another strip of cover material after the same is placed on the sewing machine, and for raising said tracks at the ends adjacent the sewing machine, means for folding the ends of each strip of cover material over the ends of a predetermined number of stay members before the same are deposited on the sewing machine, means for actuating the sewing machine to secure the stay members in position in their strip of cover material to form a corset stay unit, and means then operative after the sewing operation is completed for forcing the corset stay unit from the sewing machine plate.

26. In a machine of the class described, a hopper for receiving corset stay members, a sewing machine, rocker frames, conveyer frames, means for connecting the said frames, an endless conveyer mounted in each conveyer frame, means for imparting an intermittent movement to each endless conveyer, means for removing the stay members from the said hopper and successively depositing the same between projections provided therefor on carriers fixed in the said conveyers, means for feeding a strip of cover material and placing the same beneath a set of stay carriers every time the conveyers come to rest, means for tilting the rocker frames, conveyer frames, and conveyers to cause said projections to pierce the cover material as the same is placed beneath a predetermined number of stay members in a pair of stay carriers, and for withdrawing the projections from another strip of cover material as the same and its stay members are delivered by the conveyers to the sewing machine, and means for actuating the sewing machine to form lines of sewing by which the stay members are secured in position in a strip of cover material to form a corset stay unit.

27. In a machine of the class described, a hopper for receiving corset stay members, a sewing machine, rocker frames, conveyer frames, means for connecting the said frames, an endless conveyer mounted on each conveyer frame, means for simultaneously imparting a regular intermittent movement to said endless conveyers, carriers mounted in corresponding positions on the said endless conveyers, pins projecting from each of the said carriers forming pockets between the same for the reception of the corset stay members, means for removing the corset stay members from the hopper and progressively placing the same in position in the pockets provided therefor, between the pins on the said carriers, means for feeding strips of cover material and successively placing the same in position beneath a set of stay carriers every time the conveyers come to rest with the ends of each strip of cover material extending beyond the ends of the stay members with which it is associated, means for tilting the rocker frames, conveyer frames, and conveyers to cause the pins to pierce a cover strip to associate the same with the said stay members in a set of carriers and to withdraw the pins from another cover strip as the same, with its stay members, are delivered by the endless conveyers to the sewing machine, means operative while the cover strips and stay members are being moved forward by the conveyers for turning the ends of each cover strip over the ends of the stay members associated therewith, and means for actuating the sewing machine to form lines of sewing by which the stay members are secured in position in a strip of cover material to form a corset stay unit.

28. In a machine of the class described, a hopper for receiving corset stay members, a sewing machine, rocker frames, conveyer frames, means for connecting the said frames, an endless conveyer mounted on each conveyer frame, means for simultaneously imparting a regular intermittent movement to said endless conveyers, carriers mounted in corresponding positions on the said endless conveyers, pins projecting from each of the said carriers forming pockets between the same for the reception of the corset stay members, means for removing the corset stay members from the hopper and successively placing the same in position in the pockets provided therefor, between the pins on the said carrier, means for feeding strips of cover material and successively placing the same in position beneath a set of stay carriers every time the conveyers come to rest with the ends of each strip of cover material extending beyond the ends of the stay members with which it is associated, means for tilting the rocker frames, conveyer frames, and conveyers to cause the pins to pierce a cover strip to associate the same with the said stay members in a set of carriers and to withdraw the pins from another cover strip as the same with its stay members are delivered by the endless conveyers to the sewing machine, guide tracks secured to the said conveyer frames and along which each cover strip, with its associated stay members, is moved by the conveyers and being provided with grooved edges, in which, after the ends of each cover strip have been folded over the stay members associated therewith, the folded ends of each cover strip and intermediate ends of the stay members passes, and means for operating the sewing machine to secure the stay members in position in the strip of cover material.

29. In a machine of the class described, a hopper for receiving corset stay units, a sewing machine, rocker frames, conveyer frames, means for connecting the said frames, an endless conveyer mounted on each conveyer frame, means for simultaneously imparting a regular intermittent movement to said endless conveyer, carriers mounted in corresponding positions on the said endless conveyers, pins projecting from each of the said carriers forming pockets between the same for the reception of the corset stay members, means for removing the corset stay members from the hopper and successively placing the same in position in the pockets provided therefor, between the pins on the said carriers, means for feeding strips of cover material and successively placing the same in position beneath a set of stay carriers every time the conveyers come to rest with the ends of each strip of cover material extending beyond the ends of the stay members with which it is associated, means for tilting the rocker frames, conveyer frames, and conveyers to cause the pins to pierce a cover strip to associate the same with the said stay members in a set of carriers and to withdraw the pins from another cover strip as the same with its stay members are delivered by the endless conveyers to the sewing machine, guide tracks secured to the said conveyer frames and along which each cover strip, with its associated stay member, is moved by the conveyers and being provided with grooved edges, in which, after the ends of each cover strip have been folded over the stay members associated therewith, the folded ends of each cover strip and intermediate ends of the stay members pass, means for operating the sewing machine for securing the stay members in a strip of cover material, and means operative when the said guide tracks are raised, through the tilting of the said frames, for removing the sewed corset stay unit from the face of the sewing machine.

30. In a machine of the class described, a hopper for receiving corset stay members, a sewing machine, rocker frames, conveyer frames, means for connecting the said frames, an endless conveyer mounted on each conveyer frame, means for simultaneously imparting a regular intermittent movement to said endless conveyers, carriers mounted in corresponding positions on the said endless conveyers, pins projecting from each of the said carriers forming pockets between the same for the reception of the corset stay members, a revoluble drum having longitudinal grooves in its periphery for successively removing the stay member from the hopper, a drum frame surrounding the said drum and from which the stay members are delivered from the drum, means for positively moving the stay members successively after being delivered from the drum to position in pockets provided therefore between the pins on said carriers, means for feeding strips of cover material and successively placing the same in position beneath a set of stay carriers every time the conveyers come to rest with the ends of each strip of cover material extending beyond the ends of the stay members with which it is associated, means for tilting the rocker frames, conveyer frames, and conveyers to cause the pins to pierce a cover strip to associate the same with the said stay members in a set of carriers and to withdraw the pins from another cover strip as the same with its stay members are delivered by the endless conveyers to the sewing machine, guide tracks secured to the said conveyer frames and along which each cover strip, with its associated stay members, is moved by the conveyers and being provided with grooved edges, in which, after the ends of each cover strip have been folded over the stay members associated therewith, the folded ends of each cover strip and intermediate ends of the stay members pass, means for operating the sewing machine to secure the stay units in position in a cover strip, and means operative when the said guide tracks are raised, through the tilting of the said frames, for removing the sewed corset stay unit from the face of the sewing machine.

31. In a machine of the class described, a hopper comprising a member immovable laterally of the machine and a member adjustable to position laterally of the machine, sewing machines, one of which is immovable laterally of the machine while the other is adjustable laterally of the machine, rocker frames, a conveyer frame, immovable laterally of the machine, a conveyer frame adjustable to position laterally of the machine, means for connecting the said rocker and conveyer frames, an endless conveyer mounted on each conveyer frame, means for imparting an intermittent movement to the said conveyers, means for removing the stay members from the said hopper to a position in pockets provided therefor between projections on the stay carriers fixed on the said endless conveyer, means for feeding strips of cover material and successively placing the same in position beneath a set of stay carriers every time the conveyers come to rest, means for tilting the rocker frames, conveyer frames, and conveyers, to cause the said projections to pierce a cover strip as the same is brought to position beneath a set of carriers and to withdraw the projections from another cover strip as the same is delivered by the endless conveyers to position to be sewed in the said sewing machines, and means for actuating the said sewing machines to secure the stay members in position in their cover strip to form a corset stay unit.

32. In a machine of the class described, a two-part hopper, one member of which is immovable laterally of the machine and the other adjustable to position laterally of the machine, a pair of sewing machines, one immovable laterally of the machine and the other adjustable to position laterally of the machine, rocker frames, a conveyer frame immovable laterally of the machine, a conveyer frame adjustable to position laterally of the machine, means for connecting the said rocker and conveyer frames, an endless conveyer mounted on each conveyer frame, means for simultaneously imparting a similar intermittent movement to said endless conveyers, carriers secured in position on the said endless conveyers, series of pins fixed in and extending from each of the said carriers providing pockets between the same for the reception of the stay members, means for successively feeding strips of cover material and placing the same in position beneath a set of stay carriers every time the conveyers come to rest with the ends of each strip of material extending beyond the ends of the stay members with which it is to be associated, means for tilting the rocker frames, conveyer frames and conveyers to cause pins on a set of carriers, at one end thereof, to pierce the cover strip as it is brought to position beneath the same, and for withdrawing the pins from another cover strip as the same is delivered by the conveyers to position on the sewing-machine, means for folding the ends of each cover strip over the ends of the stay members associated therewith, means for actuating the sewing machines to secure the stay members in position in the cover strip to form a corset stay unit, and means for moving the said adjustable members to position laterally of the machine.

33. In a machine of the class described, devices for holding corset stay members, devices for removing the corset stay members therefrom and associating the same with a cover strip, the ends of which when so associated extend beyond the ends of the stay members, devices for folding the ends of the cover strip over the ends of the stay members associated therewith, and devices for securing the stay members in position in the cover strip associated therewith to form a corset stay unit.

34. In a machine of the class described, devices for holding corset stay members, devices for removing the corset stay members therefrom and associating the same with a cover strip, the ends of which when so associated extend beyond the ends of the stay members, devices for folding the ends of the cover strip over the ends of the stay members associated therewith, a sewing machine for securing said stay members in position in a cover strip to form a corset stay unit.

35. In a machine of the class described, devices for holding corset stay members, a sewing machine, a conveyer for receiving successively predetermined numbers of corset stay members and moving the same to said sewing machine, devices for feeding successively a cover strip for each predetermined number of stay members, and devices for folding the ends of each cover strip over the end of a predetermined number of stay members so that the same may be sewed in position in their cover strip by the said sewing machine to form a corset stay unit.

Signed by us this 20th day of August, 1915.

WALDEMAR KOPS.
SIMON COOPER.

Copies of this patent may be obtained for five cents each, by addressing the "Commissioner of Patents, Washington, D. C."